June 24, 1969  E. WILDHABER  3,451,290
GEAR DRIVE WITH AXIALLY OVERLAPPING GEARS
Filed April 3, 1967  Sheet 1 of 2
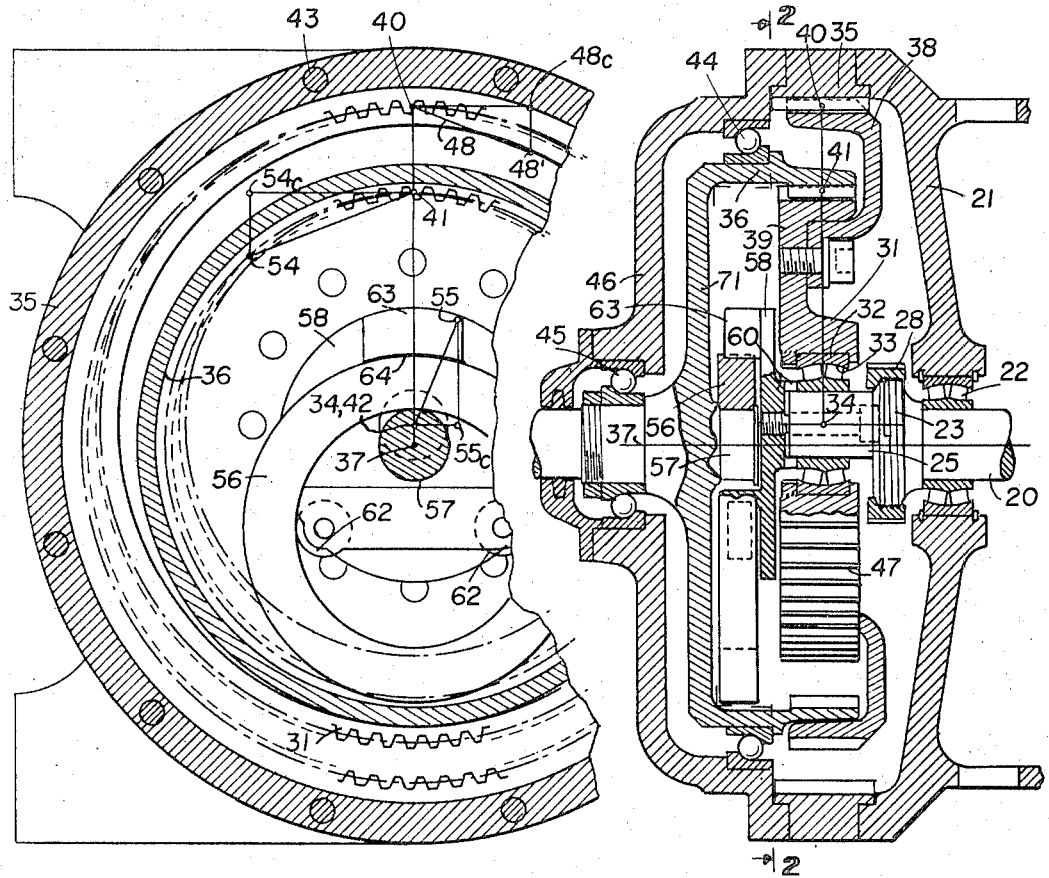
FIG. 2    FIG. 1
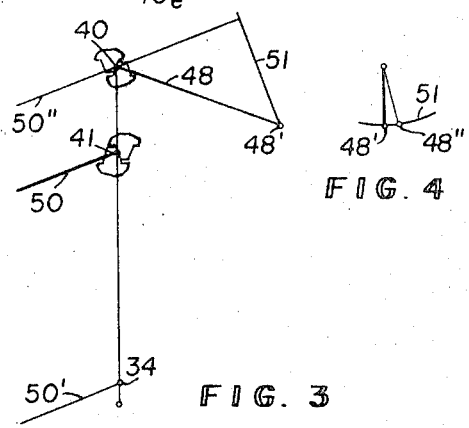
FIG. 5
FIG. 4
FIG. 3
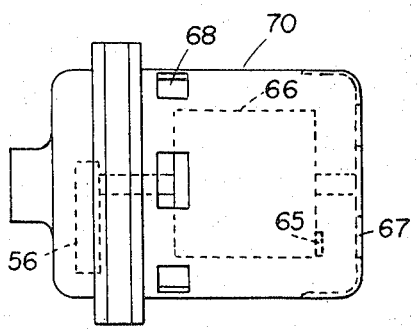
FIG. 6
INVENTOR:
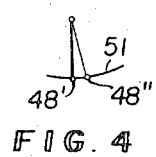
Ernest Wildhaber

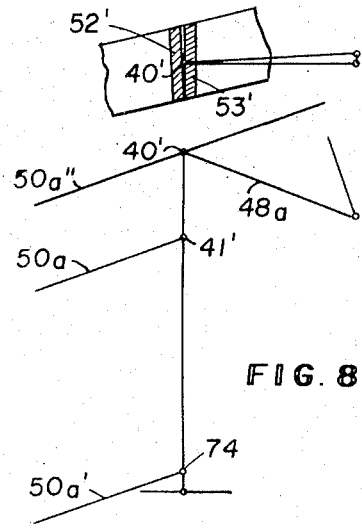
FIG. 9
FIG. 8
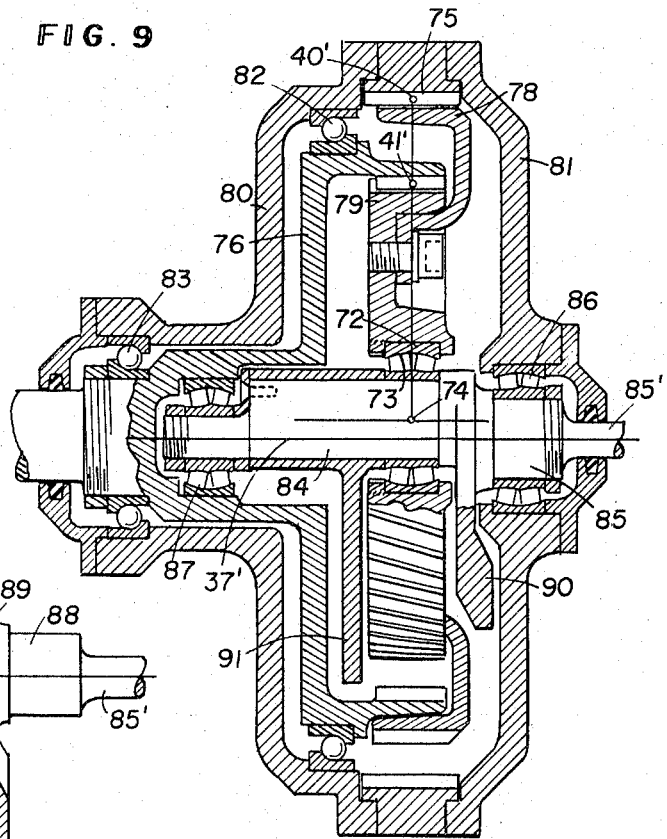
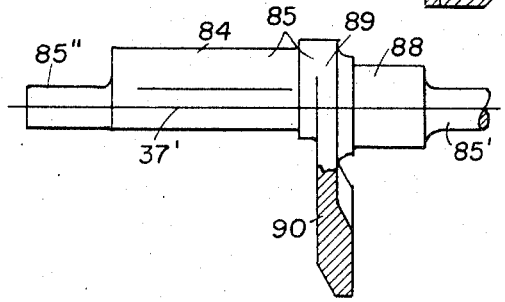
FIG. 10        FIG. 7
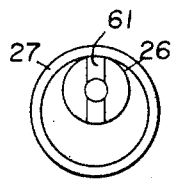 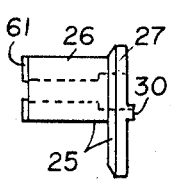 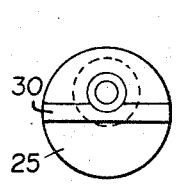 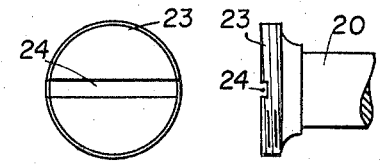
FIG. 11   FIG. 12   FIG. 13   FIG. 14   FIG. 15
INVENTOR:
Ernest Wildhaber United States Patent Office 3,451,290
Patented June 24, 1969

1

3,451,290
GEAR DRIVE WITH AXIALLY OVERLAPPING
GEARS
Ernest Wildhaber, Brighton, N.Y.
(124 Summit Drive, Rochester, N.Y. 14620)
Filed Apr. 3, 1967, Ser. No. 627,782
Int. Cl. F16h 1/32
U.S. Cl. 74—804                                    11 Claims

ABSTRACT OF THE DISCLOSURE

Gear drives of the invention comprise two coaxial internal gears one inside the other, and two external gears meshing with the internal gears and slightly smaller than these. The external gears are rigid with each other. The drives are compact and in a planetary drive can attain high transmission ratios in a single step, but have large loads on the gear teeth and on the high-speed bearings. The invention lowers the load on these bearings, and it raises the strength of the gear teeth by providing a self-adjustment of the external gears, so that the tooth load does not shift lengthwise of the teeth, regardless of deflection, and always keeps centered near the middle of the intermeshing teeth.

---

When embodied as a planetary drive, the external gears constitute the planet and are mounted on an eccentric portion of the high-speed shaft. One of the internal gears is maintained stationary while the other is the low-speed member.

The drive can also be run on fixed axes, for instance in a centrifuge to provide two coaxial members of slightly different speeds.

In all cases the drive can be kept very compact, but has large tooth loads that repeat very rapidly.

One object of the present invention is to increase the strength of the teeth of such drives by automatically keeping the tooth load centered near the tooth middle. A further object is to decrease the loads exerted on the high-speed bearings, thereby also increasing the efficiency of the drive.

Another aim is to devise a geared motor with such a planetary drive, where the high-speed shaft of the gear drive is mounted solely on the two spaced bearings of the electric rotor, and where the load exerted on the more highly loaded bearing is decreased by a roller design of a counter-weight. A further object is to devise a drive for use in a geared motor permitting a whole range of eccentricities with the same head of the motor drive-shaft.

A further object is to provide an improved drive-shaft with eccentric portion.

Other objects will appear in the course of the specification and in the recital of the appended claims.

The invention can be considered an improvement on the structure described in my application Ser. No. 586,767, filed Oct. 14, 1966.

In the drawings:

FIG. 1 is an axial section of the drive as applied to a geared motor.

FIG. 2 is a section taken along lines 2—2 of FIG. 1, looking in the direction of the arrows.

2

FIGS. 3, 4 and 5 are diagrams explanatory of the self-adjustment of the planet, as provided by the invention.

FIG. 6 is a diagrammatic plan view of a geared motor, shown at a reduced scale, showing the disposition of the counter-weights.

FIG. 7 is an axial section of an independent gear drive separate from a motor.

FIGS. 8 and 9 are diagrams explanatory of the self-adjustment of the planet when the gear teeth are helical.

FIGS. 10 to 15 are detail views.

FIG. 10 is a side view and section of the shaft 85 with eccentric portion used in the embodiment of FIG. 7.

FIGS. 11 and 13 are opposite end views, and FIG. 12 is a side elevation of part 25 of FIG. 1. FIGS. 14 and 15 are an end view and a side view of the head of shaft 20 of FIG. 1.

For convenience, the drives shown in the figures will be referred to as reduction drives. However the same structures apply to speed-up drives, where the high-speed shaft is the driven member.

In the embodiment shown in FIGS. 1 and 2 the drive shaft 20 is mounted in a motor housing 21 on two bearings, of which only one bearing 22 is shown. Shaft 20 has an enlarged head 23 (FIGS. 1, 14, 15) threaded on its outside and provided with a keyway 24 on its plane face. A part 25 (FIGS. 1, 11, 12 and 13) with eccentric portion 26 and a flange portion 27 is rigidly secured to head 23 by a nut 28 engaging the thread of head 23. A flange of the nut engages a conical side surface provided on portion 27 while a key-like projection 30 of part 25 engages keyway 24 of shaft 20.

A planet 31 is rotatably mounted on the eccentric portion 26 by means of a spherical roller bearing 32 whose outer race has a spherical raceway 33 centered at 34.

The gearing contains two internal gears 35, 36 of different diameter, that have a common axis 37 with the drive shaft 20. They overlap axially so that one is inside the other. They mesh respectively with two external gears 38, 39 that are rigid with each other and together constitute the planet 31. The mid-points 40, 41 of their mesh zones lie approximately in a plane perpendicular to axis 37. The center 34 of raceway 33 lies on the connecting line 40–41 and on the axis 42 of the eccentric 26.

Internal gear 35 is maintained stationary by being secured to the motor housing 21, as with screws 43 (FIG. 2). The other internal gear 36 is the low-speed member of the drive, the driven member in a reduction drive. It is mounted on two bearings 44, 45 in an endplate 46 rigid with housing 21.

I have discovered that in the mesh of the two planet gears with their internal mating gears the tooth loads can be kept centered at mid-points 40, 41, regardless of deflection and slight inaccuracies, by aligning the gears axially and by mounting the planet on properly placed spherical bearing means. This is true with helical as well as with straight teeth. It permits to use teeth that have no crowning or very little of it, so that the tooth contact is spread over the entire length of the teeth at all times. Such teeth can carry more load than even properly crowned teeth. Crowning also avoids detrimental end bearing, but does so by restricting the tooth bearing area and concentrating the load.

As the self adjustment corrects misalignment the rims back of the gear teeth can be kept thinner than in conventional practice, without penalty. This permits to use smaller diameter differences between the two internal gears to obtain larger transmission ratios.

In the embodiment shown in FIG. 1 gear 39 has straight teeth 47 and all the other gears also. It will now be shown with FIGS. 3 to 5 how the pivotal mounting of the planet keeps the tooth pressures centered at points 40, 41 respectively.

Diagram FIG. 3 is a view taken in the same direction as FIG. 2. Opposite sides of the teeth are in contact in the two mesh zones. 48 is the surface normal, the perpendicular to the contacting tooth surfaces, at point 40. 50 is the surface normal at point 41. Slight turning of the planet about either normal 48 or 50 will not disturb the tooth contact at point 40 or 41 respectively. Nor does turning about an axis parallel to the normal and passing through bearing center 34. This shift merely adds a displacement along the length of the teeth. Thus a slight turning displacement about an axis 50' does not disturb the mesh at point 41, but it changes the mesh at point 40. The normal 48 then assumes an angular position as if turned about an axis 50" parallel to 50 and passing through point 40. End point 48' then moves slightly on a circle 51 that in FIG. 3 shows as a straight line. End point 48' then moves to position 48", see side view FIG. 4 and plan view and section FIG. 5.

FIG. 5 shows a tooth 52 of internal gear 35 contacting a tooth 53 of planet gear 38 initially at an angle, at point 40e. Eccentric pressure at point 40e in the inclined direction of normal 48 effects the described angular displacement to the position of equilibrium. It brings the planet teeth 53 into full contact with teeth 52, so that the tooth pressure is centered at point 40, without disturbing the mesh at point 41.

If the mesh is off point 41 but right on point 40 a similar displacement occurs about a line parallel to normal 48. Both angular displacements may occur simultaneously.

The planet moves in all cases about center 34 to equilibrium position, where the tooth pressures are centered at points 40 and 41 respectively.

The planet is kept clear of all portions which might interfere with such small displacements. Space is provided between gear 38 and the stationary parts 21, 46; also between gear 38 and the end of gear 36 and any other parts that might interfere with or limit the required displacement about center 34.

The resultant tooth loads act substantially along the tooth surface normals. FIG. 1 shows corresponding tooth loads 40–48', 41–54. The length between the end points is plotted in proportion to the load. 40–48c and 41–54c are the peripheral load components. The peripheral load component 42–55c exerted on the eccentric is relatively small. However the total load depends also on the radial components 48c–48', 54c–54. At negligible inertia loads it is the geometric resultant 42–55, much larger than peripheral component 42–55c.

It depends much on the pressure angle or profile inclination of the teeth. When the tooth number difference between the intermeshing gears is small, the pressure angle may be dictated by the phenomenon known as internal interference, where the relative path of the tip of one tooth interferes with the tip of the mating tooth. Increasing the pressure angle and reducing the tooth depth are known helps for avoiding interference.

A big help in decreasing the radial pressure on the eccentric is the centrifugal inertia load. It tends to pull the planet outwardly, so that some or all of the radial tooth-pressure components are taken up by the inertia load.

I may design a planetary drive so that at a given load near the rated load the centrifugal pull just balances the radial tooth load components, so that then the peripheral component 42–55c is the total load exerted on the eccentric bearing. The centrifugal pull depends on the weight of the planet, on its eccentricity and on the rotational speed of the drive shaft. The planet is designed to have its center of gravity at the bearing center 34.

A counterweight is required for mass balance. When it is made rigid with the drive shaft the gain obtained on the eccentric bearing from the centrifugal pull does not extend to the bearings of the drive shaft. The drive shaft then has to take also the pull of the counterweight.

To avoid a very high load on bearing 22, the invention provides a main counterweight in the form of a ring 56, whose cylindrical inside surface rolls on the cylindrical outside surface of a projection 57. Projection 57 is rigid with gear 36 and the low-speed shaft of the drive. The drive shaft moves relatively to it. The centrifugal pull exerted by ring 56 on the low-speed gear 36 is opposite to the radial component of the tooth pressure exerted thereon and does not materially affect its bearing load. But bearing 22 of the high-speed shaft carries now a small load, that corresponds to the moderate load exerted on the eccentric.

Ring 56 is kept in proper time by a part 58 secured to the eccentric 26. Part 58 has a generally disk-like body with a projection 60 that fits over the eccentric. The projection has a slot matching a face spline 61 (FIGS. 1, 11, 12) provided on eccentric 26. Part 58 is held in place by a screw that extends along the axis of the eccentric and threads into part 58.

Part 58 mounts two rollers 62 that engage the inside surface of ring 56. A lateral projection 63 further holds the ring in place with a guide surface 64. It is without load in operation.

Broadly I may use rolling counterweights that roll on a part with respect to which the drive shaft moves and that is coaxial with the drive shaft. This part may be rigid with the low-speed gear or in other cases may be stationary. The counterweight is preferably of ring shape and rolls with its inside surface on said part.

As the ring 56 is not directly in line with the planet center of gravity 34 a further, minor, counterweight is required for full mass balance. This is shown in the small-scale view of FIG. 6, which shows ring 56 and small counterweight 65 attached to the rotor 66 of the electric motor adjacent its distant end remote from the gearing. It can be inserted through an air intake opening 67. Outlet openings 68 for the air are provided on the outside surface 70 of the motor. A fan (not shown) may be added for air circulation.

It should be noted that counterweight 56 is placed between the planet and the side wall 71 of the low-speed internal gear 36, and that one (44) of the two bearings supporting gear 36 is applied on its outside surface thus shortening the structure.

Lubrication may be effected in a suitable known way not shown.

*Further embodiment*

FIGS. 7 to 10 illustrates a drive with separate housing and with a drive shaft supported on both sides of its eccentric portion. Furthermore the self-adjusting mounting is here applied to gears with helical teeth. Straight or helical teeth may be used in all embodiments.

The gears of this embodiment are similar to those already described, except for their helical teeth. Coaxial internal gears 75, 76 overlap axially. Gear 75 is maintained stationary. It is part of the housing that is made up of the gear and two end members 80, 81. Gear 76 is mounted on bearings 82, 83 in end member 80. The internal gears 75, 76 mesh which external gears 78, 79 respectively which also overlap axially and extend one inside the other. Gears 78, 79 are rigid with each other and constitute the planet mounted on eccentric portion 84 of drive shaft 85. A roller bearing 72 mounts them thereon. It has a concave spherical outer raceway 73 centered at 74 on the axis of the eccentric portion 84. Center 74 lies on a straight line that passes through the desired centers 40', 41' of tooth pressure. This line lies in a plane perpendicular to the axis 37' of the drive shaft. The planet is designed to have its center of gravity at center 74.

To have the desired self-adjustment of the planet operate also with helical teeth, all four gears should have helical teeth of the same hand and leads different in such a way as to have the same helix angle at the pitch surface. Diagram FIG. 8 represents a plane section perpendicular to the pitch helix at points 40', 41', that is a section normal to the tooth surface at both points. The tooth surface normals 48a, 50a lie in the drawing plane. FIG. 9 is a plan view and section, like FIG. 5, showing tooth 52' of internal gear 75 contacting tooth 53' of mating gear 78 at one end. A turning displacement about a line 50a'' parallel to normal 50a would restore contact at mean point 40' without disturbing the mesh at point 41'. The actual displacement is about a parallel line 50a' passing through center 74. This merely adds a displacement in the direction of the helix tangent of the teeth. It does not disturb the mesh. Load appplied at the end of tooth 53' produces a turning moment about center 74 and initiates the displacement to the position of equilibrium, where the load exerted on tooth 53' is centered at 40'.

Broadly the position of equilibrium is automatically arrived at, to keep the tooth loads centered at points 40', 41' respectively.

Thus it is seen that the described mounting of the pair of eccentric gears is effective also with helical teeth.

The drive shaft 85, shown separately in FIG. 10, is supported on both sides of its eccentric portion 84 by two bearings 86, 87. Bearing 86 is held in end member 81. Bearing 87 is inside of the hub of internal gear 76.

The one-piece drive shaft 85 is designed to avoid an excessive diameter of tre ecceitric portion and yet permit the bearing to be mounted thereon. It contains coaxial end portions 85', 85'' of relatively small diameter, a portion 88 coaxial therewith, and eccentric portion 84. Portions 88, 84 have larger diameters adapted to the load they have to carry. The circular profile of portion 85'' may reach up to that of the extended cylindrical outside surface of eccentric 84, but does not project beyond it. The circular profile of portion 88 projects beyond it. The circular profile of portion 88 projects beyond it. The portion 89 that connects portions 84, 88 contains a counterweight 90. Another counterweight 91 is provided on the opposite side of the planet. It projects from a hub fitting over the eccentric 84 and rigidly secured thereto.

Smaller diameter bearing 87 has less capacity that bearing 86 and is set further away from center 74, so that it carries less load. In consequence the eccentric portion 84 is long, at least double the width of the tooth engagement of gears 76, 79.

In place of the counterweights 90, 91, that are rigid with the high-speed shaft 85, I may also use rollers similar to roller 56 of FIGS. 1 and 2.

When the gear drive is embodied as a speed-up drive, the high-speed shaft previously called drive shaft is the driven member, and the slow-speed member is the driver.

When the gear drive is run on fixed axes, the shaft (20, 85) that was the high-speed element is maintained stationary in regular operation; and one of the two internal gears drives the other at a very slight speed difference.

Further modifications may be made in my invention by applying customary practice and common knowledge of the art to which the invention pertains, and without departing from its spirit. For definition of its scope it is relied on the appened claims.

I claim:

1. A gear drive comprising a member rigid with two external cylindrical gears of different diameter, said gears overlapping axially so that one reaches inside the other, two coaxial elements rigid with two internal gears respectively that mesh with said external gears and form two gear pairs with them, a third element carrying said member, means for keeping the pressure exerted between the intermeshing teeth centered adjacent a preselected fixed pressure point on each recited gear pair, said means being antifriction bearing means containing a spherical raceway so as to permit pivotal adjustment about the center of said raceway, and means for maintaining one of said elements stationary while the other two elements are driving and driven parts respectively.

2. A gear drive according to claim 1, wherein said member is rotatably mounted on a single antifriction bearing having a concave spherical outer raceway.

3. A gear drive according to claim 1, wherein the teeth of the recited four gears are straight and parallel to the gear axes.

4. A gear drive according to claim 1, wherein the teeth of the recited four gears are helical, wherein the hand of said four gears is the same but the lead of their teeth is different in such a way that the helix angle at the pitch radius is the same, at least approximately.

5. A gear drive according to claim 1, for use with an electric motor, wherein the member containing the two external gears is a planet mounted eccentrically on the drive shaft, and wherein counterweight means are disposed adjacent said planet on the side away from said motor.

6. A planetary gear drive according to claim 5, wherein minor counterweight means are carried by said drive shaft adjacent the distant end of the motor.

7. In a planetary gear drive, a planet mounted eccentrically on the high-speed shaft of the drive, counterweight means for said planet in the form of a ring, the inside surface of said ring engaging and rolling on a circular portion with respect to which said high-speed shaft moves, said portion being coaxial with said high-speed shaft, and means carried by said high-speed shaft for guiding said ring.

8. The combination according to claim 7, wherein the circular portion on which said ring rolls is rigid with the low-speed shaft of the drive.

9. A planetary gear drive for use with an electric motor that is disposed in a housing having bearing supports at opposite ends and having a drive shaft rotatably mounted solely in said housing in said bearing supports, said drive shaft having an enlarged head concentric therewith and projecting outwardly of its bearing support, said head having a transverse portion on its outside face for transmitting torque, a part secured to said head and engaging said portion, said part containing an eccentric, a planet rotatably mounted on said eccentric, said planet containing two avially overlapping gears rigid therewith, one reaching inside the other, two internal gears coaxial with said drive shaft and in mesh respectively with the two gears of the planet, a housing portion secured to the motor housing, one of said internal gears being rigid with said housing portion, the other internal gear being rotatably mounted therein and being the driven member.

10. A gear drive according to claim 1, wherein said third element is the drive shaft and the member with two external cylindrical gears is a planet rotatably mounted on an eccentric portion of the drive shaft, wherein said drive shaft contains two cylindrical portions coaxial therewith and of different diameter located on opposite sides of said eccentric portion, the circular profile of the cylindrical portion of smaller diameter extending inside of the circular profile of the eccentric portion without projecting beyond it and the circular profile of the cylindrical portion of larger diameter projecting beyond the circular profile of the eccentric portion.

11. A gear drive comprising a rotary member, two external gears of different diameter rigid with said rotary member, said gears overlapping axially, two coaxial elements, two internal gears rigid with said two coaxial elements, respectively, and meshing with said external gears and forming two gear pairs with them, a rotatable third element coaxial with said internal gears and having an eccentric portion, means for rotatably mounting said rotary member on said eccentric portion with freedom to pivot in all directions about a point of the axis of rotation of said rotary member, and means for maintaining one of said elements stationary while the other two elements are the driving and driven parts, respectively.

References Cited

UNITED STATES PATENTS

| | | | |
|---|---|---|---|
| 908,529 | 1/1909 | Williams | 74—804 |
| 1,514,938 | 11/1924 | Taub | 74—805 |
| 2,049,696 | 8/1936 | Fliesberg | 74—805 |
| 2,482,568 | 9/1949 | Werner | 74—805 X |
| 2,881,619 | 4/1959 | Fox et al. | 74—805 X |
| 2,966,078 | 12/1960 | Wright | 74—805 |

FOREIGN PATENTS

| | | |
|---|---|---|
| 1,097,256 | 2/1955 | France. |
| 1,184,067 | 2/1959 | France. |

DONLEY J. STOCKING, Primary Examiner.

T. C. PERRY, Assistant Examiner.

U.S. Cl. X.R.

74—410, 598, 805